May 21, 1968 M. J. HALINSKI ET AL 3,384,780
SLAVE OSCILLOSCOPE REMOTELY ACTIVATED BY MASTER OSCILLOSCOPE
Filed Nov. 7, 1966 3 Sheets-Sheet 2
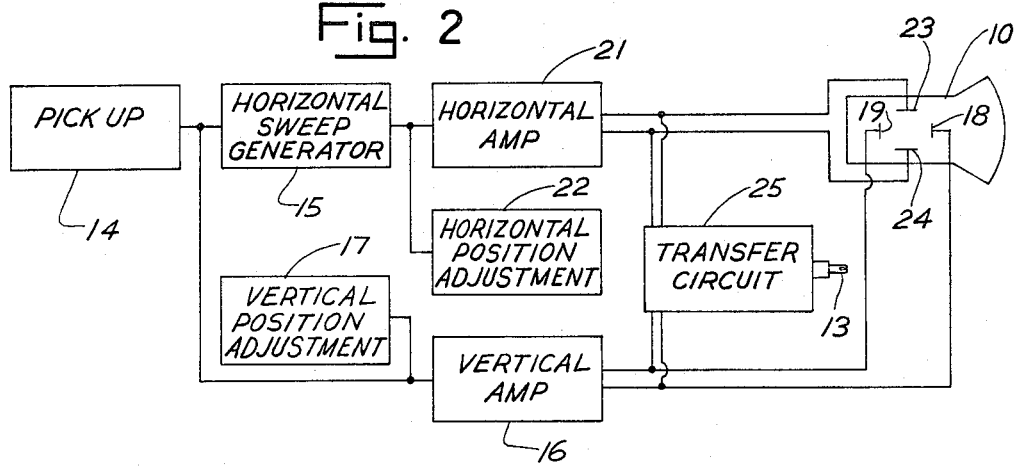
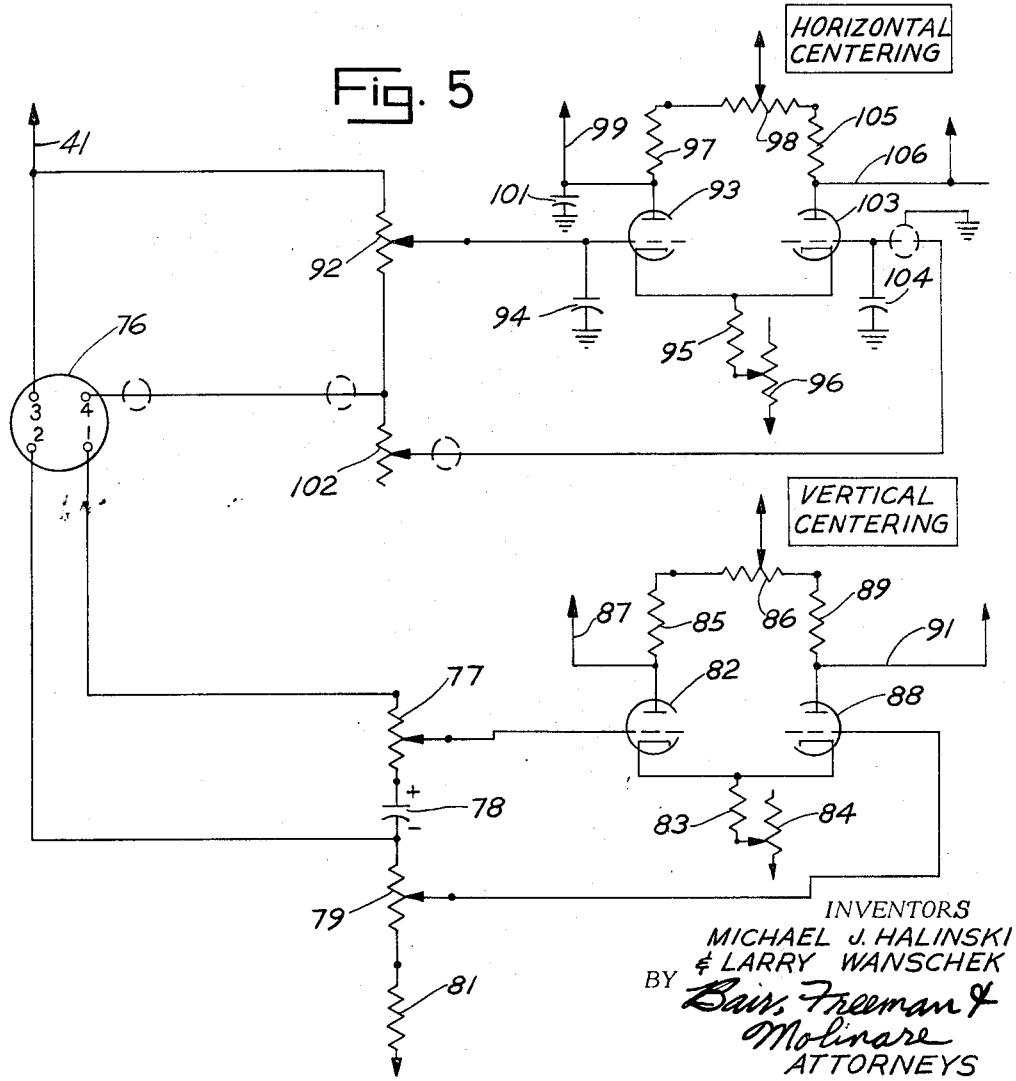
INVENTORS
MICHAEL J. HALINSKI
& LARRY WANSCHEK
BY Bair, Freeman & Molinare
ATTORNEYS

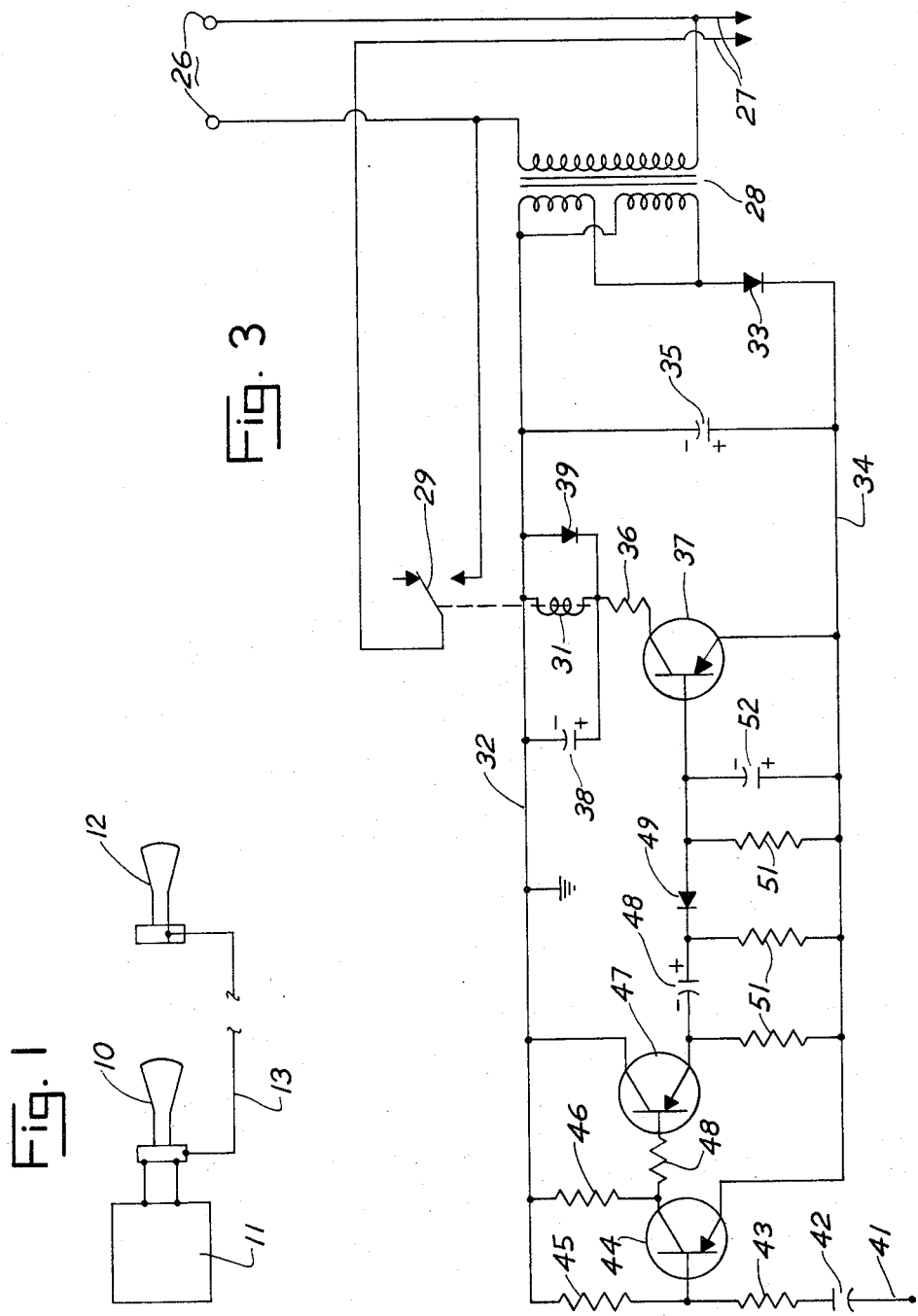

INVENTORS
MICHAEL J. HALINSKI
& LARRY WANSCHEK

United States Patent Office 3,384,780
Patented May 21, 1968

3,384,780
SLAVE OSCILLOSCOPE REMOTELY ACTIVATED
BY MASTER OSCILLOSCOPE
Michael J. Halinski, Arlington Heights, and Larry
Wanschek, Chicago, Ill., assignors to Sun Electric
Corporation, a corporation of Delaware
Filed Nov. 7, 1966, Ser. No. 592,601
2 Claims. (Cl. 315—9)

ABSTRACT OF THE DISCLOSURE

A monitoring oscilloscope system in which a monitoring oscilloscope is connected to a master oscilloscope to duplicate the master oscilloscope pattern at the remote location of the monitoring oscilloscope. The monitoring oscilloscope is turned on automatically whenever the master oscilloscope is turned on, in response to a control signal derived from the horizontal sweep circuit of the master oscilloscope. The connections between the pattern and control signal sources in the master oscilloscope and the control elements in the monitoring oscilloscope are made through individual cathode follower circuits having resistor elements which also serve as grid bias resistors for the monitoring oscilloscope amplifiers.

---

This invention relates to a monitoring oscilloscope system, and more particularly to a system in which a monitoring oscilloscope is connected to a master oscilloscope to duplicate the pattern on the master oscilloscope at a remote point.

There are many test operations using oscilloscopes of which internal combustion engine ignition system testing is an example, in which it is desirable to duplicate the pattern on the primary or master oscilloscope on a remote or monitoring oscilloscope. No systems have heretofore been available in which the monitoring oscilloscope is controlled by the master oscilloscope automatically and simultaneously to duplicate the pattern on the master oscilloscope. The principal object of the present invention is to provide such a system.

Another object is to provide a monitoring oscilloscope system in which the monitoring oscilloscope is turned on automatically whenever the master oscilloscope is turned on, in response to a signal derived from the horizontal sweep circuit of the master oscilloscope. This insures that the beam of the monitoring oscilloscope will not remain stationary over a period of time sufficient to burn the phosphorescent material from its screen.

Another object is to provide a monitoring oscilloscope system in which vertical and horizontal signals from the master oscilloscope are transferred to the pattern control elements of the monitoring oscilloscope to duplicate the master pattern on the monitoring oscilloscope.

According to a feature of the invention, connections from the signal sources in the master oscilloscope to the control elements in the monitoring oscilloscope are made through individual cathode follower circuits. The cathode follower circuits preferably include resistors connecting the cathode to the grid and between which resistors and the cathodes connections are made to amplifier circuits in the monitoring oscilloscope whereby the resistors function also as grid bias resistors for the amplifiers.

The above and other objects and features of the invention will be more readily apparent from the following description when read in connection with the accompanying drawings in which:

FIGURE 1 is a diagrammatic view of a monitoring oscilloscope system embodying the invention;

FIGURE 2 is a block diagram of the master oscilloscope circuit;

FIGURE 3 is a circuit diagram of the circuitry present in the monitoring oscilloscope to turn it on and off;

FIGURE 5 is a circuit diagram of the horizontal and vertical amplifier circuits in the monitoring oscilloscope.

Figure 4:
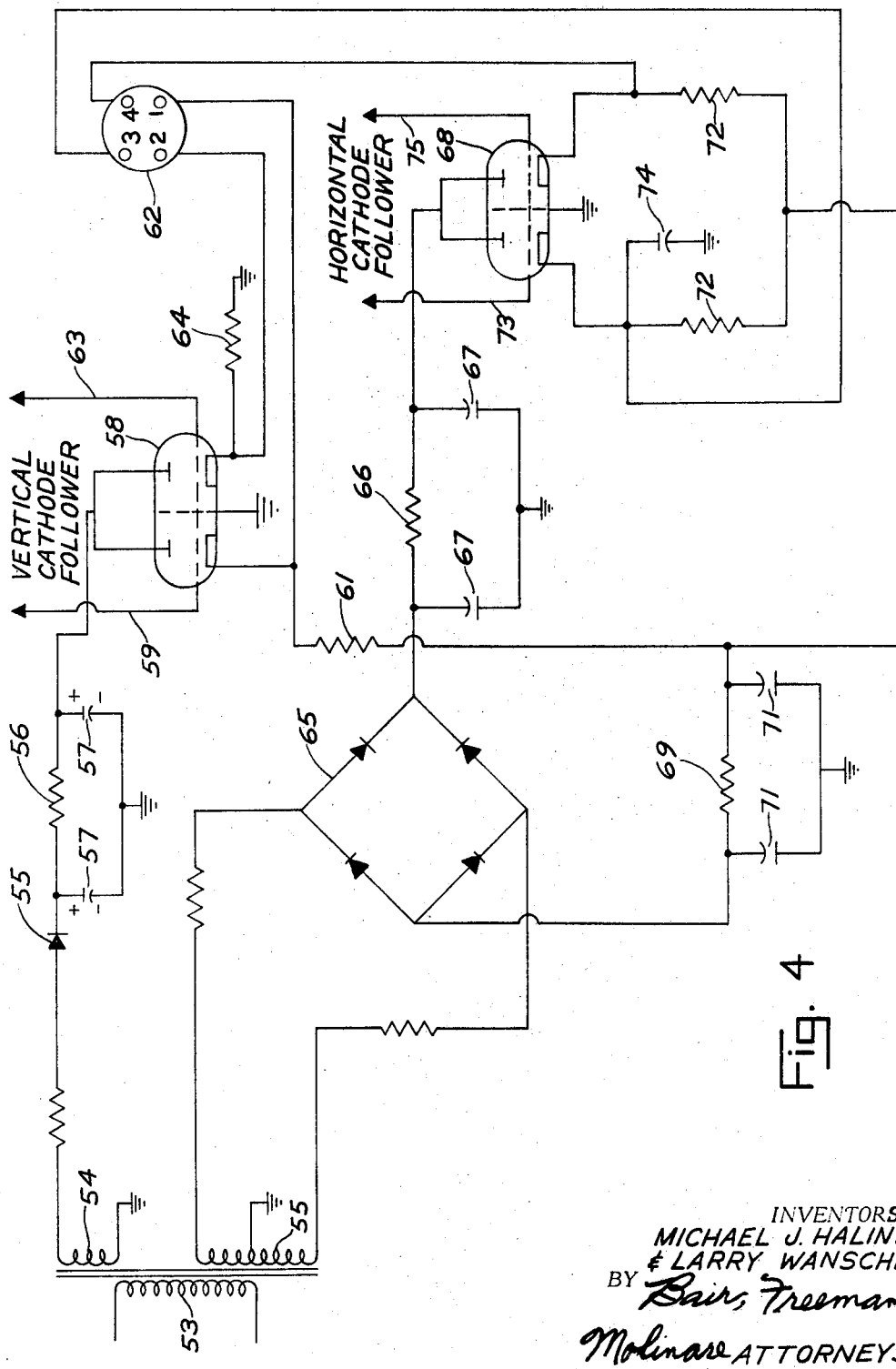
FIGURE 4 is a circuit diagram of the transfer circuitry in the master oscilloscope to transfer vertical and horizontal signals to the monitoring oscilloscope.

As shown diagrammatically in FIGURE 1, a master oscilloscope is provided having a cathode ray tube 10 and circuitry 11 which may receive signals from apparatus to be tested such as the ignition circuit of an internal combustion engine to produce on the face of the cathode ray tube a pattern indicative of the characteristics of the signals. A monitoring oscilloscope 12 may be provided at a remote point and may be connected to the master oscilloscope 10 through a cable 13 so that the monitoring oscilloscope will be controlled from the master to produce instantaneously and automatically a duplicate of the pattern appearing on the master.

The master oscilloscope as illustrated in block diagram in FIGURE 2 may be conventional except for the inclusion of certain special transfer circuitry to be described hereinafter. As illustrated in FIGURE 2, the signal to be measured is picked up by a pickup 14, which may be a connection to a portion of an engine ignition circuit or an inductive coil which will pick up signal pulses from the ignition wiring. The signal is supplied to a horizontal sweep generator 15 to synchronize the horizontal sweep on the cathode ray tube with the repetition rate of the signal being picked up. The signal is also supplied to a vertical amplifier 15 which may be biased to position the signal vertically on the face of the tube by a vertical position adjustment circuit 17. The vertical amplifier is connected to the vertical deflection plates 18 and 19 of the cathode ray tube to control the vertical characteristics of the pattern produced by the tube. The output of the horizontal sweep generator is supplied to a horizontal amplifier 21 which may be biased by a horizontal position adjustment 22 to position the pattern horizontally on the face of the tube. The output of the horizontal amplifier is connected to horizontal deflection plates 23 and 24 of the cathode ray tube.

In addition to the circuit elements described above, all of which may be conventional, the master amplifier includes a transfer circuit 25 which is connected to the outputs of both the vertical and horizontal amplifiers and which is connected through the cable 13 to the monitoring oscilloscope.

The monitoring oscilloscope is normally turned off and is turned on in response to a signal from the master oscilloscope by the circuit as shown in FIGURE 3. As shown, the monitoring oscilloscope is adapted to be energized by a source of power 26 through leads 27 which are connected to the power transformer of the monitoring oscilloscope. A transformer 28 has its primary winding connected across the power source to be energized whenever the power source is turned on. One of the leads 27 goes directly to the monitoring oscilloscope while the other goes through a relay switch 29 to the power source. The relay switch 29 is normally open and is adapted to be closed when the coil 31 is energized.

The secondary of the transformer 28 is connected at one side to a line 32 and is connected at its other side through a rectifier 33 to a line 34. Preferably, a capacitor 35 is connected between the lines 32 and 34 to assist in smoothing out ripple in the voltage output. One side of the coil 31 is connected to the line 32 and the other side is connected through a resistor 36 to the collector of a transistor 37. The emitter of transistor 37 is connected to line 34 so that when the transistor is conducting, the coil will be energized. The coil is preferably shunted by a capacitor 38 and a rectifier 39 to absorb high voltage pulses resulting from turning the coil on and off.

The transistor 37 is controlled in response to a signal from the master oscilloscope which is preferably derived from the horizontal sweep circuit thereof. A pulse from the horizontal sweep circuit of the master oscilloscope is received at 41 and is transmitted through a capacitor 42 and a resistor 43 to the base of a transistor 44. The base of transistor 44 is also connected to the line 32 through a resistor 45, and the collector of transistor 44 is connected to line 32 through a resistor 46. The emitter of the transistor 44 is connected directly to the line 34.

When the transistor 44 is made conductive, it supplies a signal to the base of a transistor 47 through a resistor 48. The collector of transistor 47 is directly connected to the line 32 and its emitter is connected through a capacitor 48 and a rectifier 49 to the base of transistor 37. Resistors 51 are connected from the opposite side of capacitor 48 and rectifier 49 to the line 34. A capacitor 52 is also connected from line 34 to the base of transistor 37.

With this circuitry the transistor 37 will be nonconductive except when a signal is supplied at line 41 so that the switch 29 will be open. However, when a signal is supplied at the line 41 and as long as that signal is present, the transistor 37 will be conductive and the switch 29 will be closed to energize the monitoring oscilloscope.

The transfer circuit of the master oscilloscope is shown diagrammatically in FIGURE 4. The transfer circuit is powered by a transformer having a primary winding 53 which is preferably connected in parallel to the same source which powers the power transformer of the master scope. The transformer has two secondary windings 54 and 55, the secondary winding 55 being center tapped, as shown. One side of the secondary winding 54 is connected to a rectifier 55 and a filter circuit including resistor 56 and capacitors 57 to both anodes of a double section vacuum tube 58. The vertical signal from the master oscilloscope is fed to the grid of one section of tube 58 through a lead 59. The cathode of that one section of tube 58 is connected through a cathode resistor 61 and filter circuit resistor 69 to the negative side of the rectifier ridge 65 and at a point between the resistor 61 and the cathode is connected to terminal No. 1 of a multiterminal plug socket 62. With this construction and connections the resistor 61 serves both as a cathode resistor for the first section of tube 58 and also as a bias resistor for the vertical signal in the monitor oscilloscope as will be more readily apparent hereinafter.

A vertical positioning signal from the circuit 17 of FIGURE 2 is supplied to the grid of the other section of tube 58 through a lead 63. The cathode of the second section of tube 58 is connected to ground through a resistor 64 and at a point between the resistor and the cathode is connected to terminal No. 2 of the plug socket 62. The resistor 64 again serves both as a cathode resistor for the second section of tube 58 and as a bias resistor for the vertical positioning amplifier in the monitoring oscilloscope.

The opposite ends of the secondary winding 55 are connected to the input terminals of a full-wave rectifier circuit 65. The positive side of the rectifier bridge 65 is connected through a filter circuit including resistor 66 and capacitors 67 to the tube plates of a double section vacuum tube 68. The negative side of the rectifier bridge is connected through a similar filter circuit including resistor 69 and capacitors 71 and through resistors 72 to the two cathodes of the double section tube 68.

The horizontal signal from the horizontal amplifier 21 of FIGURE 2 is supplied to the grid of the first section of tube 68 through a lead 73. A point between the cathode of the first section of tube 68 and the resistor 72 therefor is connected to ground through a capacitor 74 and is also connected to terminal No. 3 of the plug socket 62. With this construction the resistor 72 serves both as a cathode resistor for the first section of tube 68 and as a grid bias resistor for the horizontal signal in the monitor oscilloscope.

The horizontal positioning signal from the master oscilloscope is supplied to the grid of the second section of tube 68 through a lead 75. A point between the cathode of the second section of this tube and the resistor 72 therefor is connected to terminal No. 4 of the plug socket 62. With this construction the resistor 72 serves both as a cathode resistor for the second section of tube 58 and as a bias resistor for the horizontal position signal of the monitor oscilloscope.

The plug socket 62 is connected through a suitable cable which may be of any desired length and which is shielded to a corresponding plug 76 in the monitoring osciliscope as shown in FIGURE 5. With the plugs 62 and 72 connected by cable, the vertical signal will be transmitted from contact 1 of plug 76 to one end of a potentiometer resistor 77 whose other end is connected through a capacitor 78 and a resistor 79 forming a part of a second potentiometer and a relatively high value resistor 81 to a source of positive DC voltage. The adjustable wiper on the potentiometer 77 is connected to the control grid of a vacuum tube 82 whose cathode is connected through resistor 83 and adjustable resistor 84 to a source of negative voltage. The anode of tube 82 is connected through resistor 85 and a vertical centering potentiometer 86 to a source of DC voltage. It will be seen that with this connection the resistor 61 in the master oscilloscope serves as a grid bias resistor for the tube 82 and that the signal impressed on the grid of the tube 82 will correspond proportionately to the vertical signal produced by the master oscilloscope. The anode of tube 82 is connected through a line 87 to one of the vertical deflection plates in the cathode ray tube of the monitoring oscilloscope.

Pin 2 of the plug 76 is connected to a point between the capacitor 78 and the upper end of the potentiometer resistor 79. The potentiometer resistor 79 and resistor 81 together with the grid bias resistor 64 in the master oscilloscope form a voltage divider circuit to impress a bias voltage through the wiper of potentiometer 79 onto the grid of a tube 88. The cathode of tube 88 is connected through resistor 83 and variable resistor 84 to the same source of negative voltage previously referred to. The anode of tube 88 is connected through resistor 89 and potentiometer resistor 86 to the source of DC positive voltage. The anode of tube 88 is also connected through a lead 91 to the other vertical deflection plate of the cathode ray tube forming a part of the monitoring oscilloscope.

The horizontal signal from the master oscilloscope received at pin 3 of plug 76 is connected to a potentiometer resistor 92 whose wiper is connected to the control grid of a tube 93. As shown, the grid may be bypassed to ground through a capacitor 94 to bypass high frequency signals. The cathode of tube 93 is connected through resistor 95 and variable resistor 96 to a source of negative voltage.

The anode is connected through resistor 97 and potentiometer resistor 98 to a source of positive voltage. The potentiometer 98 enables the monitor oscilloscope to be properly calibrated for centering of the pattern in a horizontal direction in the same manner as the potentiometer 86 permits centering of the pattern vertically on the monitoring oscilloscope. The anode of tube 93 is connected through a line 99 with one of the horizontal deflection plates of the monitoring oscilloscope, with a bypass to ground being provided through a capacitor 101 to bypass high frequency components. The horizontal positioning signal received at pin 4 of plug 76 is connected through a potentiometer 102 to the grid of a tube 103, with a bypass to ground being provided by a capacitor 104. The cathode of tube 103 is connected through resistors 95 and 96 to the negative voltage source referred to above, and its anode is connected through resistor 105 and potentiometer 98 to a plus voltage source. The anode of tube 103 is also connected through a line 106 to the other horizontal deflection plate of the cathode ray tube forming a part of the monitoring oscilloscope.

With the system of the present invention when a test is to be performed on an automobile ignition system or the like, the master oscilloscope is hooked up to the ignition system in the usual manner to receive signals therefrom. When the master oscilloscope is turned on and its horizontal sweep circuit is energized, the monitoring oscilloscope which may be at any desired remote location will also be turned on. As signals are supplied from the ignition system to the master oscilloscope, corresponding horizontal and vertical signals will be supplied to the monitoring oscilloscope so that it will exactly and simultaneously duplicate the pattern appearing on the master oscilloscope. In those cases when, for example, the master oscilloscope is producing a raster display with the pattern for each engine cylinder appearing in superimposed relationship to patterns for the other engine cylinders, the same raster display will be shown on the monitoring oscilloscope. Thus whenever a test is performed by use of the master oscilloscope, the test results can be observed simultaneously at any desired remote position through the monitoring oscilloscope.

While one embodiment of the invention has been shown and described in detail, it will be understood that this is illustrative only and is not to be taken as a definition of the scope of the invention, reference being had for this purpose to the appended claims.

What is claimed is:

1. A monitoring oscilloscope system comprising a master oscilloscope having a horizontal sweep signal generating circuit, a horizontal position signal circuit, a vertical signal circuit, and a vertical position signal circuit, a monitoring oscilloscope adapted to be positioned remotely from the master oscilloscope and including horizontal and vertical pattern control elements, a switch in the monitoring oscilloscope to connect it to a source of power, said switch comprising the series combination of a normally non-conductive semiconductor and a current activated means, means connected to the horizontal sweep signal generating circuit for biasing said semiconductor into the conductive condition for energizing said current-activated means when the horizontal sweep signal generating circuit is energized, and connections from the horizontal sweep signal generating circuit and the horizontal position signal circuit to the horizontal pattern control elements in the monitoring oscilloscope and from the vertical signal circuit and the vertical position signal circuit to the vertical pattern control elements in the monitoring oscilloscope whereby the monitoring oscilloscope will duplicate the pattern on the master oscilloscope.

2. The system of claim 1 in which the last named connections include cathode follower circuits connected to the signal circuits in the master oscilloscope to be controlled thereby and whose outputs are connected to the pattern control elements in the monitoring elements in the monitoring oscilloscope respectively.

References Cited
UNITED STATES PATENTS

| | | | |
|---|---|---|---|
| 2,131,203 | 9/1938 | Von Ardenne | 315—20 |
| 2,185,705 | 1/1940 | Du Mont | 315—20 X |
| 2,222,426 | 11/1940 | White et al. | 315—20 |
| 2,476,167 | 7/1949 | Wendt | 315—20 |
| 2,485,568 | 10/1949 | Cleaver | 315—9 |

ROBERT SEGAL, *Primary Examiner.*